March 18, 1930.    J. L. GREEN    1,751,324
FLUID AIR CLEANER
Filed May 21, 1928
Fig.1.
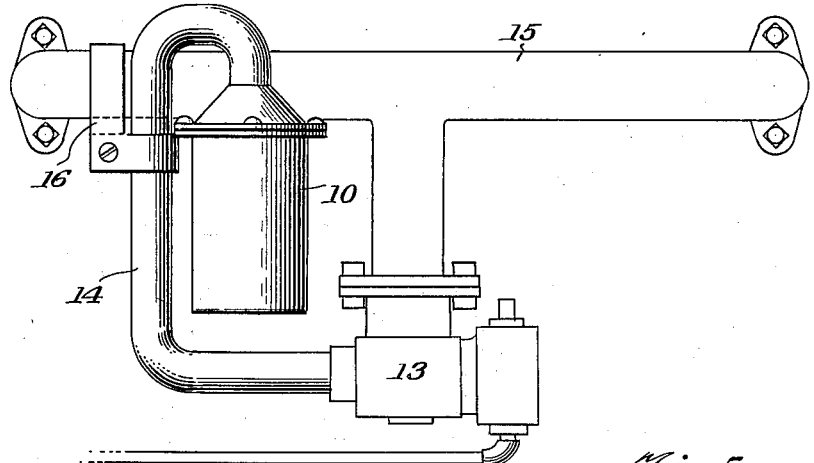
Fig.2.
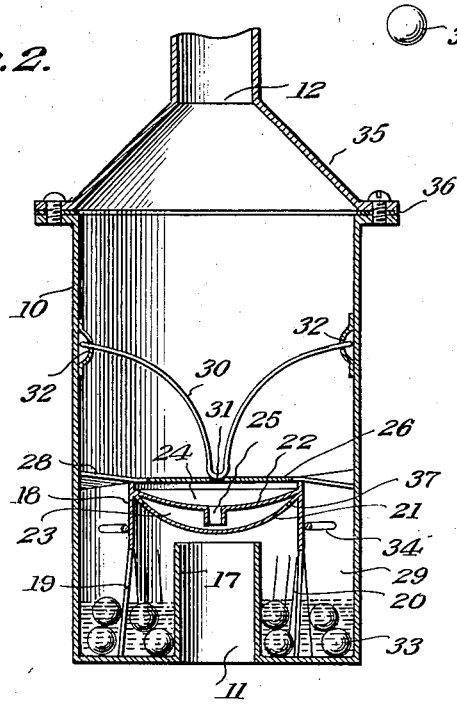
Fig.6.
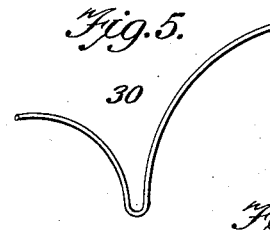
Fig.5.
Fig.3.
Fig.4.
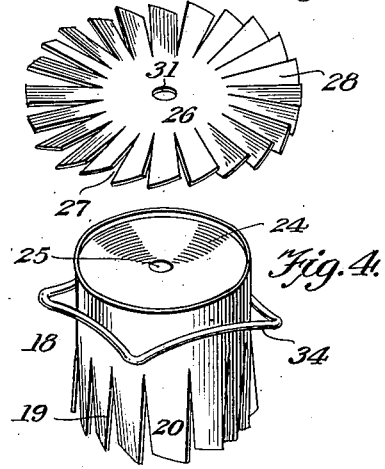
John L. Green
INVENTOR
BY *Victor J. Evans*
ATTORNEY Patented Mar. 18, 1930

1,751,324

UNITED STATES PATENT OFFICE

JOHN L. GREEN, OF EL DORADO, ARKANSAS

FLUID AIR CLEANER

Application filed May 21, 1928. Serial No. 279,585.

This invention relates to air cleaners for internal combustion engines and has for an object the provision of a device which may be used to filter the air before the latter enters the intake manifold of the engine, or before the air enters the crank case, the invention being useful in either connection, as well as for cleaning air for many other purposes.

Another object of the invention is the provision of an air filter which includes movable dust collecting elements arranged in the path of the incoming air, with means to wash the dust from said elements and retain the latter in the washing fluid so that the dust will not be permitted to pass through the cleaner.

Another object of the invention is the provision of an air cleaner which may be readily taken apart for cleaning and thereafter reassembled.

With the above and other objects in view, the invention further includes the following novel features and details of construction, to be hereinafter more fully described, illustrated in the accompany drawing and pointed out in the appended claims.

In the drawing:—

Figure 1 is an elevation showing the invention in position for use.

Figure 2 is an enlarged vertical sectional view of the cleaner.

Figure 3 is a detail perspective view of the dust guard.

Figure 4 is a like view of the dust trap.

Figure 5 is a detail perspective view of the spring locking member.

Figure 6 is a view of one of the dust collecting elements.

Referring to the drawing in detail wherein like characters of reference denote corresponding parts, the reference character 10 indicates a housing or container within which the operative elements of the invention are removably secured. This housing is provided with an intake opening 11 and an outlet opening 12, the latter having communication with the air intake of a carbureter 13 through the medium of a pipe or conduit 14. The carbureter is secured to the intake manifold of an engine which is indicated at 15, while the cleaner is supported by the manifold through the medium of a clamp 16 which provides connection between the manifold and the pipe 14.

The intake opening 11 is surrounded by a flange or thimble 17 which extends upwardly within the housing and a trap 18 surrounds this flange or thimble.

The trap 18 is substantially cup-shaped and is inverted over the inner end of the thimble 17 and its side walls are provided with spaced slits 19 between which are provided blades 20. The bottom of the cup-shaped member which forms the top of the trap 18 is inwardly curved as shown at 21, while an additional or auxiliary bottom 22 is provided which is so shaped and spaced from the part 21 as to provide a moisture chamber 23 having a wall 24 upon its top. A thimble 25 provides communication between the moisture chamber 23 and the wall 24.

Extending transversely of the housing on top of the trap 18 is a disk 26. This disk is provided with radial slits 27 between which are provided blades 28. These blades and the blades 20 are inclined so as to provide deflectors with which the dust contacts before passing through the slits 19 and 27. The disk 26 thus provides a guard at the top of a fluid chamber 29 which is formed in the bottom of the housing and whose walls are defined by the walls of the housing and flange or thimble 17.

The parts just described are removably positioned within the housing and in order to hold them in place, the invention provides a resilient locking member 30 which is shown in detail in Figure 5 of the drawing. This member is substantially V shaped and has its central pointed portion removably positioned within an opening 31 provided in the disk 26. The opposite ends of the member 30 are removably engaged within sockets 32 upon the walls of the housing 10.

Dust collecting elements 33 are located in the fluid chamber 29, while the trap whose lower edge rests upon the bottom of the fluid chamber, is centered and held in centered position by means of a centering member 34.

The top of the housing is closed by a substantially cone-shaped cap 35 with which the pipe 14, communicates, while a gasket 36 renders the joint between the housing and cap leakproof.

Suction from the engine will draw particles of dust into the cleaner through the intake opening 11 and these particles of dust will strike against and be deflected by the curved top 21 of the trap.

The top 21 of the trap is provided with openings 37, and air passing into the trap through the thimble 17, will pass through the slots 19, picking up globules of oil. Some of the oil or other moisture carried by the air will enter the chamber 23 through the inner ends of the slits 27 and through the passage 25, and will overflow from the chamber 23 through the openings 37 and be distributed over the bottom surface of the wall 21 and the inner wall of the trap 18. The oil thus distributed will act to collect and prevent the passage of dust through the housing.

The balls 33 being coated with oil will also assist in collecting dust, as they move about within the chamber 29, both within and out of the oil, so that dust collected by the balls will be washed therefrom. Dust which might pass through the slits 20 uncollected, will be collected by the blades 28 of the guard 26.

By detaching the ends of the locking member 30 from the sockets 32 after the housing has been removed from the cap 35, the trap, guard and balls may be readily removed for cleaning and thereafter easily replaced.

The invention is susceptible of various changes in its form, proportions and minor details of construction and the right is herein reserved to make such changes as properly fall within the scope of the appended claims.

Having described the invention what is claimed is:

1. An air cleaner comprising a housing having an inlet, an outlet spaced from the inlet and adapted to be connected with the intake manifold of an engine, a flange surrounding the inlet and extending into the housing and providing therewith a fluid chamber between said flange and housing, an air trap positioned in the path of the incoming air between the inlet and outlet to direct said air downwardly into fluid contained within the fluid chamber, and a guard comprising a disk arranged transversely of the housing between the inlet and outlet upon the air trap and having radially disposed slits therein and inclined blades between the slits, and a substantially V-shaped resilient locking member having its central portion bearing upon the guard and its opposite ends detachably secured to the wall of the housing to removably hold the parts in position.

2. An air cleaner comprising a housing having an inlet, an outlet spaced from the inlet and adapted to be connected with the intake manifold of an engine, a flange surrounding the inlet and extending into the housing and providing therewith a fluid chamber between said flange and housing, an air trap positioned in the path of the incoming air between the inlet and outlet to direct said air downwardly into fluid contained within the fluid chamber, and a guard comprising a disk arranged transversely of the housing between the inlet and outlet and having radially disposed slits therein and inclined blades between the slits, and a moisture compartment in the top of the trap in communication with the fluid chamber.

3. An air cleaner comprising a housing having an inlet, an outlet spaced from the inlet and adapted to be connected with the intake manifold of an engine, a flange surrounding the inlet and extending into the housing and providing therewith a fluid chamber between said flange and housing, an inverted substantially cup-shaped member positioned over and spaced from the flange and having its side walls longitudinally slitted, inclined blades between the slits of the side walls, a disk arranged transversely of the housing upon the cup-shaped member and having radially disposed slits therein and inclined blades between the slits to define a dust guard, and means bearing upon the guard and engaging the housing to removably hold the parts in position.

4. An air cleaner comprising a housing having an inlet, an outlet spaced from the inlet and adapted to be connected with the intake manifold of an engine, a flange surrounding the inlet and spaced from the housing and providing therewith a fluid chamber, a trap positioned in the path of the incoming air to direct air downward into the fluid within the fluid chamber, and means to distribute the fluid over the inner walls of the trap.

In testimony whereof I affix my signature.

JOHN L. GREEN.